April 17, 1934.     P. F. HARRIS     1,955,496
PEDESTAL BLOCK TRAP
Filed June 3, 1930     3 Sheets-Sheet 1
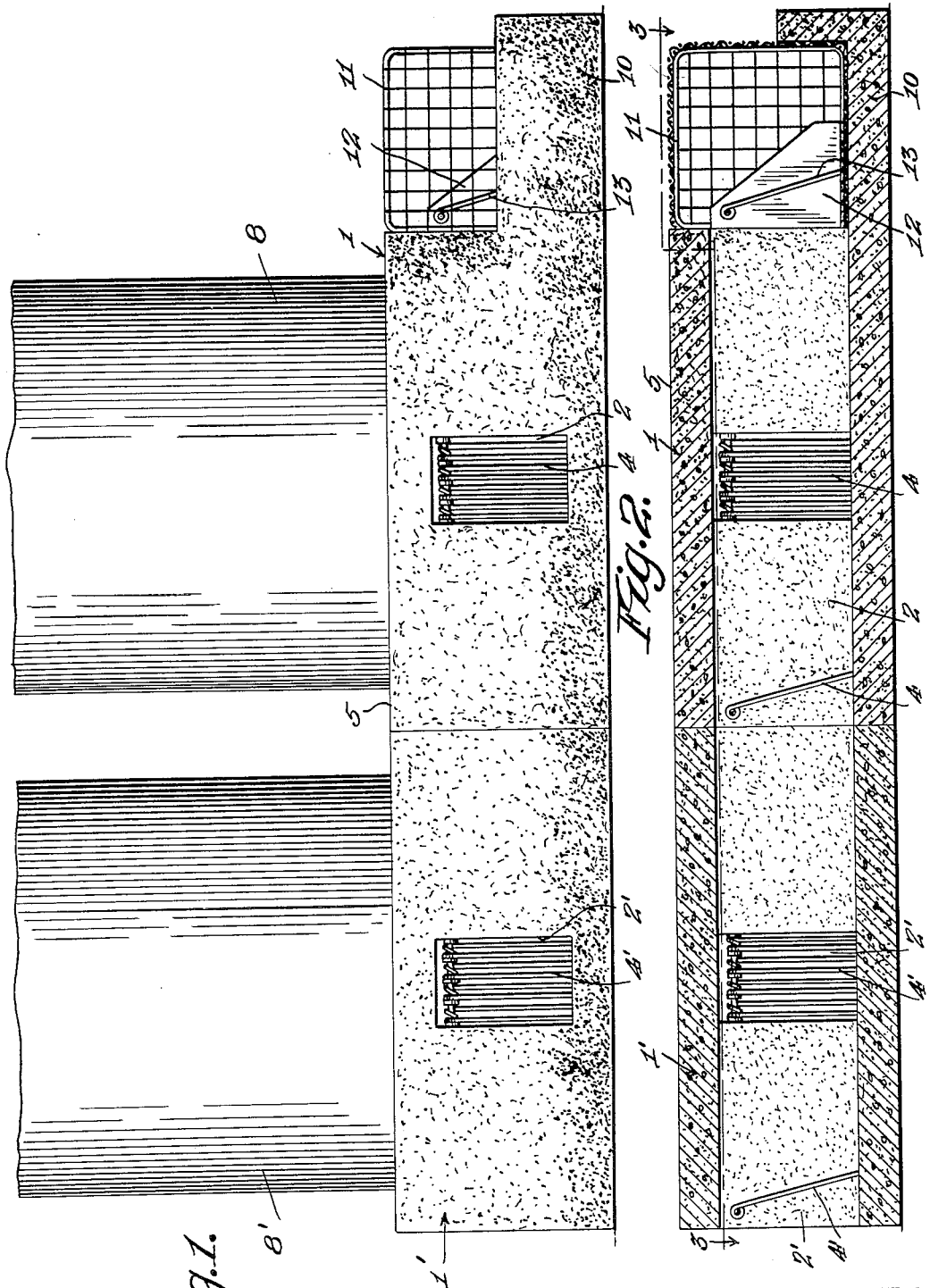
INVENTOR
Parley F. Harris
WITNESS: Alfred Glascock

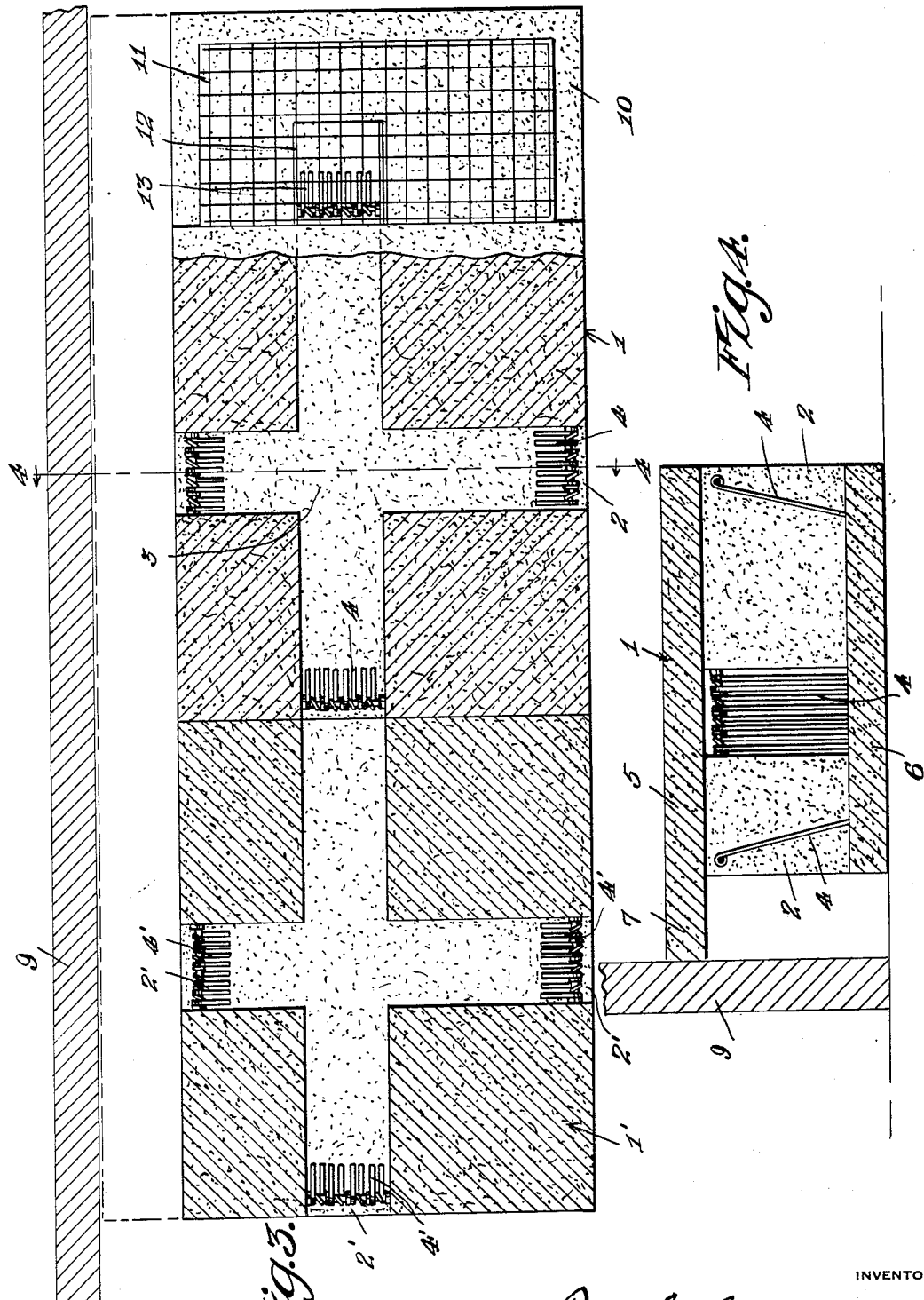

April 17, 1934.   P. F. HARRIS   1,955,496
PEDESTAL BLOCK TRAP
Filed June 3, 1930   3 Sheets-Sheet 3

INVENTOR
Parley F. Harris

WITNESS: Alfred E. Blasiwick

Patented Apr. 17, 1934

1,955,496

UNITED STATES PATENT OFFICE 1,955,496

PEDESTAL BLOCK TRAP

Parley F. Harris, Washington, D. C.

Application June 3, 1930, Serial No. 459,069

4 Claims. (Cl. 43—66)

This invention relates to a pedestal trap and it consists in the novel features hereinafter described and claimed. An object of the invention is to provide a trap adapted to serve as a pedestal for supporting a garbage can or similar container, the said trap being in the form of a block having sufficient weight to rest firmly upon the ground and serve as a foundation upon which the can may rest.

A further object of the invention is to provide in conjunction with the block a removable cell in which the animal or animals are confined after they have been induced to enter the trap. The said cell is preferably exposed at a side portion of the block so that the presence of the confined animals may be observed at a distance.

A further object of the invention is to provide a pedestal block trap structure, the body portion of which is cast or molded from concrete or other cementitious material in order to add the desired weight to the structure and in the interest of economy in production. The said block is provided with an interiorly located pound area and passageways communicating with the said pound area and opening at their ends at the side edges of the block.

These passageways are controlled by swingable barrier gates and the cell is provided with an inlet passageway also having a swingable barrier gate.

In the accompanying drawings Figure 1 is a side elevational view of a series of the pedestal trap blocks with a garbage can resting upon each block of the series.

Figure 2 is a vertical sectional view of the blocks as shown in Figure 1.

Figure 3 is an enlarged horizontical sectional view of the blocks cut on the line 3—3 of Figure 2.

Figure 4 is a transverse sectional view cut on the line 4—4 of Figure 3.

Figure 5:
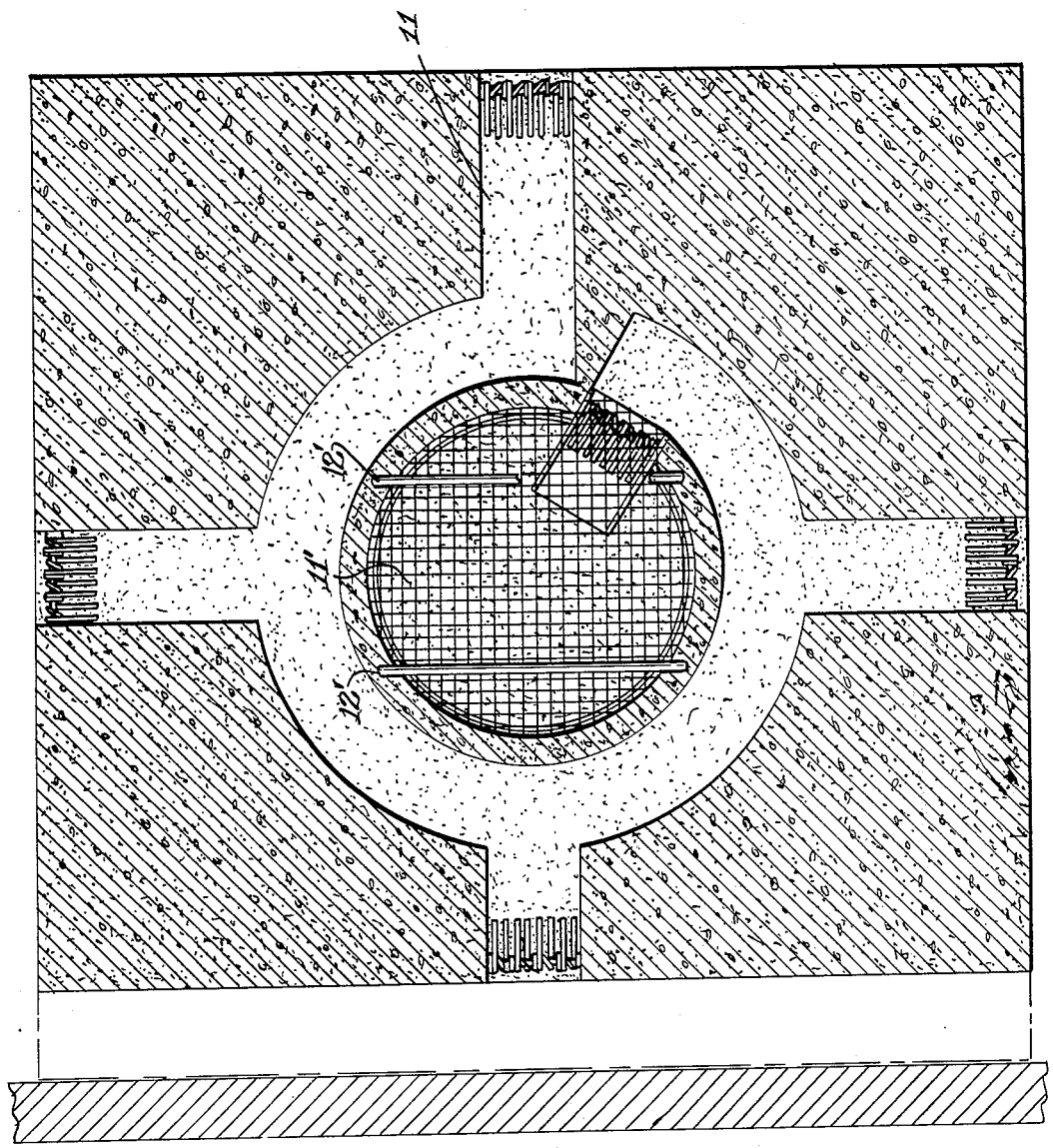
Figure 5 is a horizontical sectional view of a modified form of the pedestal trap block.

The pedestal block trap comprises a body 1 which may be formed from concrete cement or similar material the said body having passageways 2 leading in from the side edges thereof. The said passageways intersect each other at the interior of the body thereby forming a pound chamber 3 as shown in the drawings, four passageways are shown but it is to be understood that a greater or less number of passageways may be provided. All of the passageways except one are provided with inwardly swingable barrier gates 4. The body 1 is provided with an upper bearing surface 5 and a lower bearing surface 6.

The top portion of the body 1 is extended beyond the side edge of the lower portion thereof as at 7 forming an extension of the bearing surface 5.

When the device is in use the surface 6 rests upon the ground and a garbage can 8 rests upon the surface 5. The extension 7 may bear against a wall 9 whereby the lower portion of the edge of the body 1 is spaced from the wall 9 and sufficient room is provided behind the body to permit rats to pass between the body and the wall and enter the passageway 2 which is disposed toward the wall 9. The body is provided at its end with a trough 10 which is located at the end of the passageway 2 which is devoid of a barrier gate 4. A cell 11 of wire mesh or other suitable material is placed in the trough 10 and with its upper side substantially at the same level of the plane in which the bearing surface 5 lies. The cell 11 is provided at its side with a runway 12 the entrance to which registers with the adjacent passageway 2 of the body 1. A barrier gate 13 is pivoted to the side walls of the runway 12 and is arranged to swing inwardly toward the center of the cell 11.

Assuming that a garbage can 8 is resting upon the surface 5 and the block and the can are located at the usual point or position the heavier fumes emanating from the contents of the can, at the top thereof, descend along the sides of the can toward the ground and the pedestal block. Thus the odor of the contents of the can passes around the edges of the block and rats are attracted toward the can and the block in the usual manner. When a rat approaches the can by the attraction of the odor it will endeavor to get at the source of origin of the odor and in doing so will move around the block and possibly try to scale the sides of the can. When the animal finds that it is impossible to get at the contents of the can by such procedure it endeavors to get under the can and in doing so enters one of the passageways 2 and passes under the barrier gate 4 thereof. The said gate 4 then closes behind the animal and the animal passes into the pound chamber 3. At this time the animal may begin to suspect that it has been trapped and will begin to exercise its intuitive suspicion. It will be cautious against retracting its steps and even should it do so it will find the gates at the entrance of the passageways closed and consequently its exit from the pound is barred. As the interior of the block is dark the animal, under the conditions stated, will move toward the light which enters through the sides of the cell 11 and that passageway which communicates with the cell. Thus the animal will pass under the barrier gate 13 and enter the cell 11. This completes the trapping of the animal and it is held in close confinement in the cell and its presence therein may be observed at a distance. When it is desired to dispense with the animal the cell 11 is removed from the trough 10 and the animal is disposed of in any usual manner.

An extension block 1' may be provided if desired and the said block consists of a body similar in its general shape to the body 1 hereinbefore described. The extension block 1' is provided with passageways 2' having swingable barrier gates 4' and one of the said passageways being devoid of such a gate. The extension block may be assembled in conjunction with the body 1 as shown in Figures 1, 2, and 3 of the drawings and a can 8' may be placed upon the extension block. When so positioned that passageway 2' of the extension block which is devoid of a gate is in register with one of the passageways 2 of the body 1 and consequently should an animal enter the extension block it will pass therefrom into the pound chamber of the body 1 and into the cell as hereinbefore described.

In the form of the invention as shown in Figure 5 of the drawings the same principles are involved but with the exception that the cell 11' is interiorly located within the block instead of exteriorly as shown and described in connection with the form of invention as shown in Figures 1-3 inclusive. The cell 11' may be lifted from its seat through the top wall of the block and is provided with bars 12', the ends of which rest upon the upper edge of the seat. When this form of my invention is in use the refuse container rests upon the upper surface of the block and overlies the cell 11'.

Having described the invention what is claimed is.

1. A pedestal block trap comprising a body having upper and lower bearing surfaces, said body having an interiorly located pound chamber with passageways communicating therewith and leading in from the side edges of the body, swingable barrier gates pivoted in the passageways the body being provided at its side with a trough extension and a removable cell fitting in said trough and having a gate controlled entrance registering with one of the passageways.

2. A pedestal block trap comprising a body having upper and lower bearing surfaces, the upper surface extending at one edge outwardly beyond the corresponding edge of the lower surface, said body having an interiorly located pound chamber with passageways communicating therewith and leading in from the side edges of the body, swingable barrier gates pivoted in the passageways and a cell detachably connected with the body and having a gate controlled entrance registering with one of the passageways.

3. A rodent trap comprising a body for supporting a refuse container and having a cut-away portion to form a seat, said body having a chamber opening outwardly through the walls thereof and with one end of the chamber terminating at said seat, a grated cell removably supported on the seat and having an entrance communicating with said end of the chamber and having a portion thereof exposed to view permitting light to enter said cell at its entrance, trap means for the entrance, and inwardly swinging gates for the openings to said chamber.

4. A rodent trap comprising a body for supporting a refuse container and having a cut-away portion to form a seat, said body having a chamber opening outwardly through the walls thereof and with one end of the chamber terminating at said seat, a grated cell removably supported on the seat and having an entrance communicating with said end of the chamber and having a portion thereof exposed to view permitting light to enter said cell at its entrance, trap means for the entrance, inwardly swinging gates for the openings to said chamber, and an extension formed on one side of the body and at the upper edge thereof to engage a wall of a structure for spacing said body from the wall to permit rodents to pass about all sides of the body.

PARLEY F. HARRIS.